March 20, 1928.  1,663,481

J. G. PECK

REFRIGERATOR FOR TWO-TEMPERATURE CABINETS

Filed Aug. 5, 1925   4 Sheets-Sheet 1

Inventor
Jacob G. Peck
By Attorney

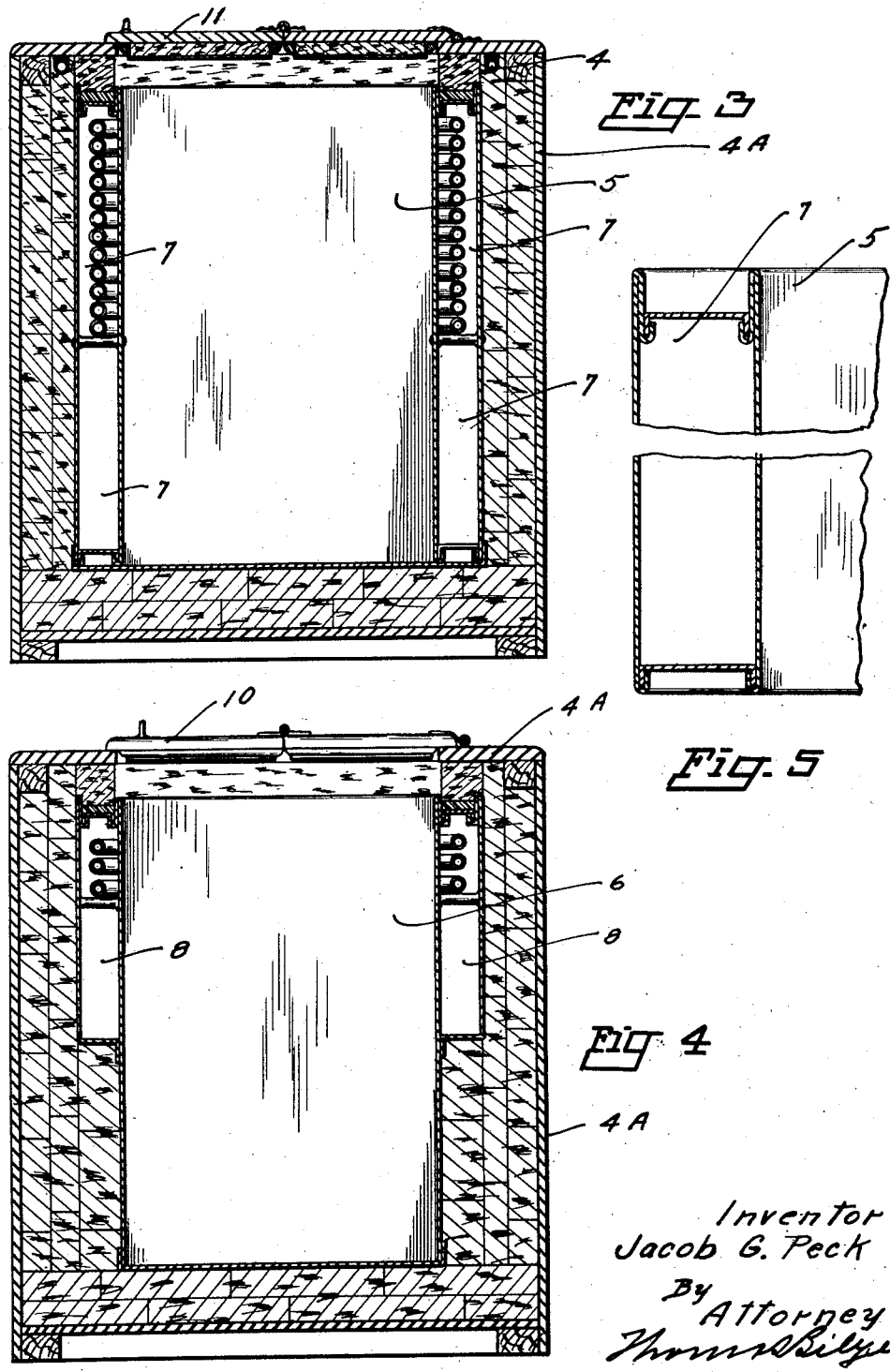

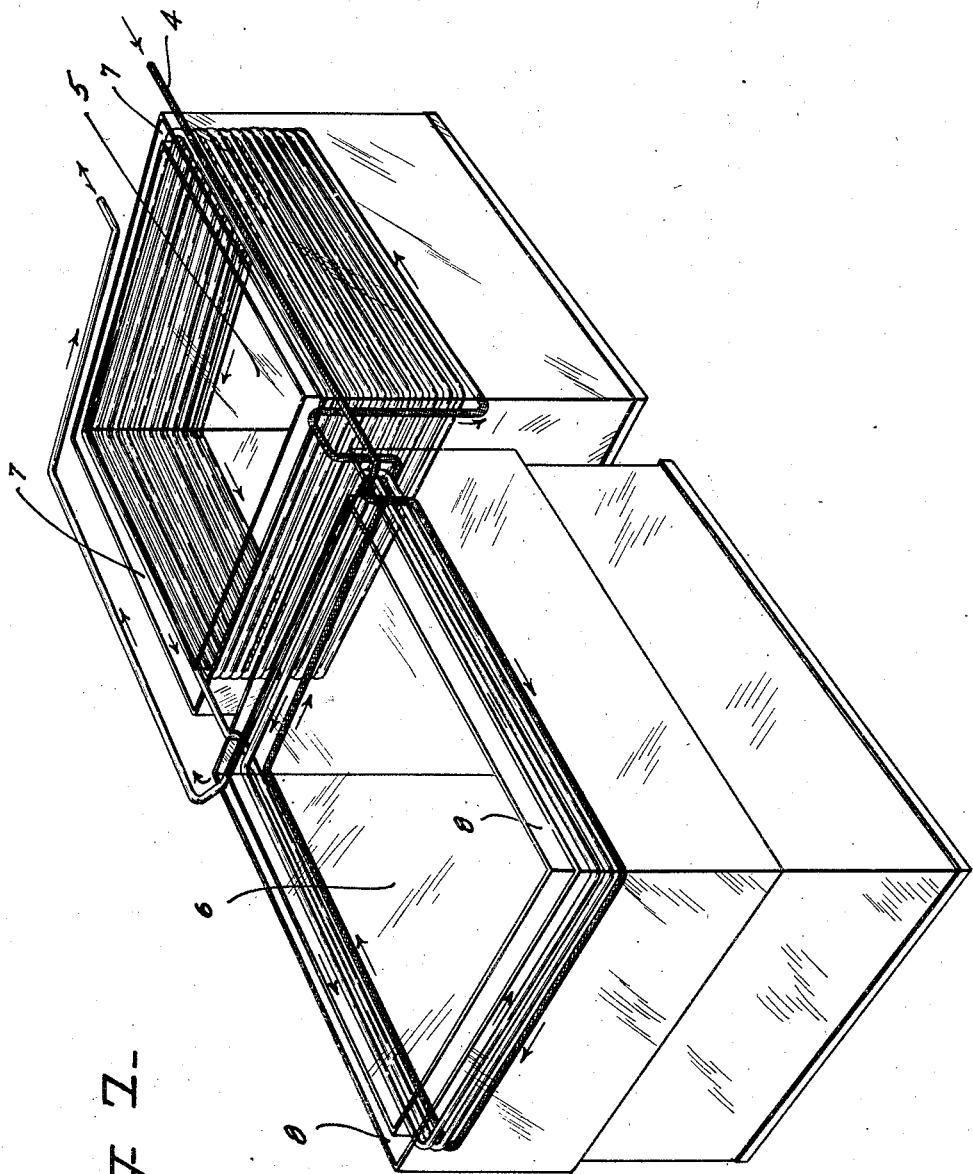

March 20, 1928.  1,663,481

J. G. PECK

REFRIGERATOR FOR TWO-TEMPERATURE CABINETS

Filed Aug. 5, 1925     4 Sheets-Sheet 4

Inventor
Jacob G. Peck
By
Attorney

Patented Mar. 20, 1928.

1,663,481

UNITED STATES PATENT OFFICE.

JACOB G. PECK, OF PORTLAND, OREGON.

REFRIGERATOR FOR TWO-TEMPERATURE CABINETS.

Application filed August 5, 1925. Serial No. 48,376.

This patent application relates to my pending application, as evidenced by Serial Number 35,996, filed in United States Patent Office, June 9, 1925, upon an ice cream cabinet and means for automatically maintaining more than one temperature therein simultaneously.

The application herewith presented, relates to patent applications filed herewith, at this time, upon a process for circulating a refrigerant in a two temperature cabinet, second, upon an application filed herewith upon a new and improved refrigerating machine support, third, upon a new and improved two temperature refrigerating and cooling cabinet.

My invention relates to a cabinet adapted for the storing and dispensing of ice cream and other commercial products of a similar nature, wherein it is desired to maintain two low temperatures within the compartments, within which the ice cream and other products are to be stored and from which they are to be dispensed.

Another object of my invention, consists in providing a cabinet with a maximum storage capacity for the total volume of the cabinet, by the arrangement of the refrigerating system therein to obtain the desired results.

A further object of my invention, consists in providing simple and efficient means for maintaining, over long periods, a fairly uniform temperature within the compartments, one of which will have a higher temperature than the other, both of which are maintained in a cool condition by the same refrigerant material being circulated through one system of expansion coils, by mechanical means.

A further object of my invention, consists in providing a simple and efficient tank within each compartment, as an independent tank, having an independent cooling medium, as brine, or diluted alcohol, or any other suitable means maintained within the tank, each tank being independent of the other and of a minimum volumetric capacity, as compared with the cubical content of the compartments, for maintaining a suitable cooling medium therein.

A further object of my invention, consists in placing tanks within each compartment, the inner side walls of which, form the side walls of the refrigerating compartments.

A further object of my invention, consists in the bottom of each refrigerated compartment being formed of suitable material for absorbing the shocks of the materials to be placed therein, as placed, free from refrigerating materials being circulated thereunder, but adapted to maintaining any liquids that may be deposited thereupon.

A further object of this invention, consists in the arrangement of the expansion coil in such a manner that the temperature of each of the compartments within the cabinet may be raised uniformly with the desired range of temperature variance therebetween.

A further object of this invention, consists in the provision wherein there is but little likelihood of any of the refrigerant material in the liquid form being returned to the compressor unit of the refrigerating machine.

A still further object of my invention, consists in the arrangement of the expansion coil of my device in such a manner that practically the full efficiency of the expansion of the refrigerant may be used in the maintaining of low temperatures within the compartments of the two temperature cabinets.

Still further objects of my invention, consist in the arrangement of the tanks for the cooling medium and the expansion coils therein so that a minimum of space is occupied by the expansion coils within the tanks, and a minimum of cooling medium need be maintained within the tanks to maintain the desired low temperatures within the compartments to be refrigerated.

With these and incidental objects in view, the invention consists in certain novel features of construction and combination of parts, the essential elements of which are set forth in the appended claims, and to a preferred form of embodiment of which is hereinafter shown with reference to the drawings which accompany and form a part of this specification.

In the drawings:—

Fig. 3 is a cross section, taken on line 3—3 of Fig. 1, looking in the direction indicated.

Fig. 4 is a cross section taken on line 4—4 of Fig. 1, looking in the direction indicated.

Fig. 5 is a partial cross section detail of a part of the tank structure, in which the cooling medium is to be maintained and in which the expansion coils are to be maintained.

Fig. 7 is an enlarged perspective view of the expansion coil made to illustrate the current flow of the refrigerant through the expansion coil.

Like reference characters refer to like parts throughout the several views.

Figure 2:
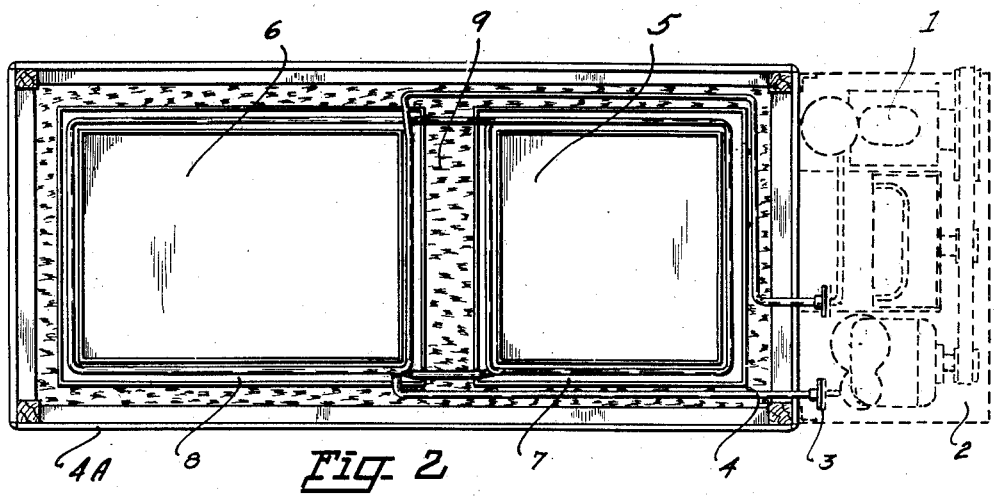
Fig. 2 is a plan view of the mechanism shown in Fig. 1, with the closure shown removed.
Figure 1:
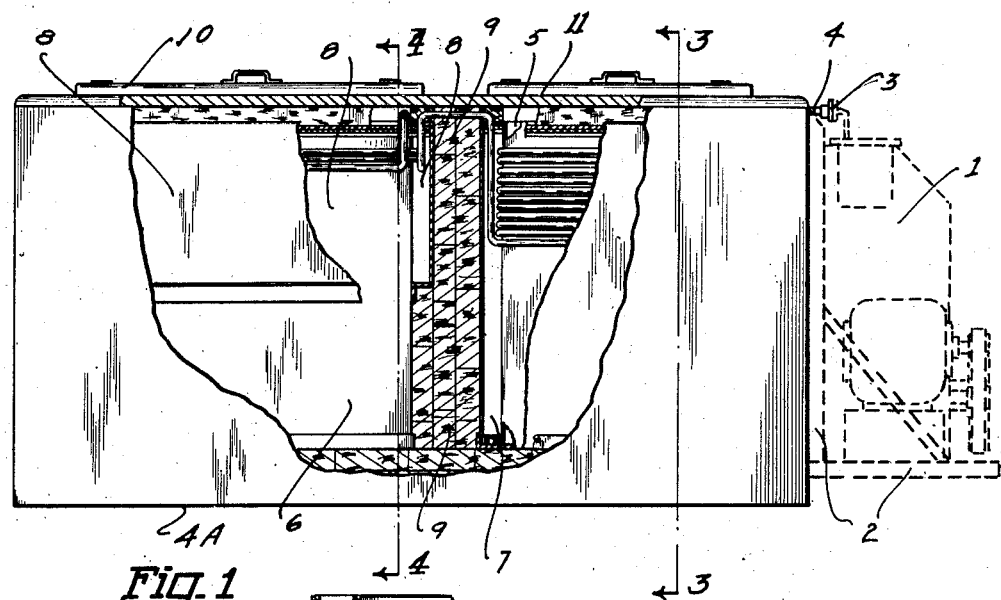
Fig. 1 is a side elevation of the assembled device, partially in section, to illustrate a preferred embodiment of the device and the arrangement of the expansion coil and the tanks for maintaining the cooling medium therein and the arrangement of the compartments, to be refrigerated.
Figure 6:
Fig. 6 is a cross section detail of one side of the tank to be placed within the high temperature compartment.
Figure 9:
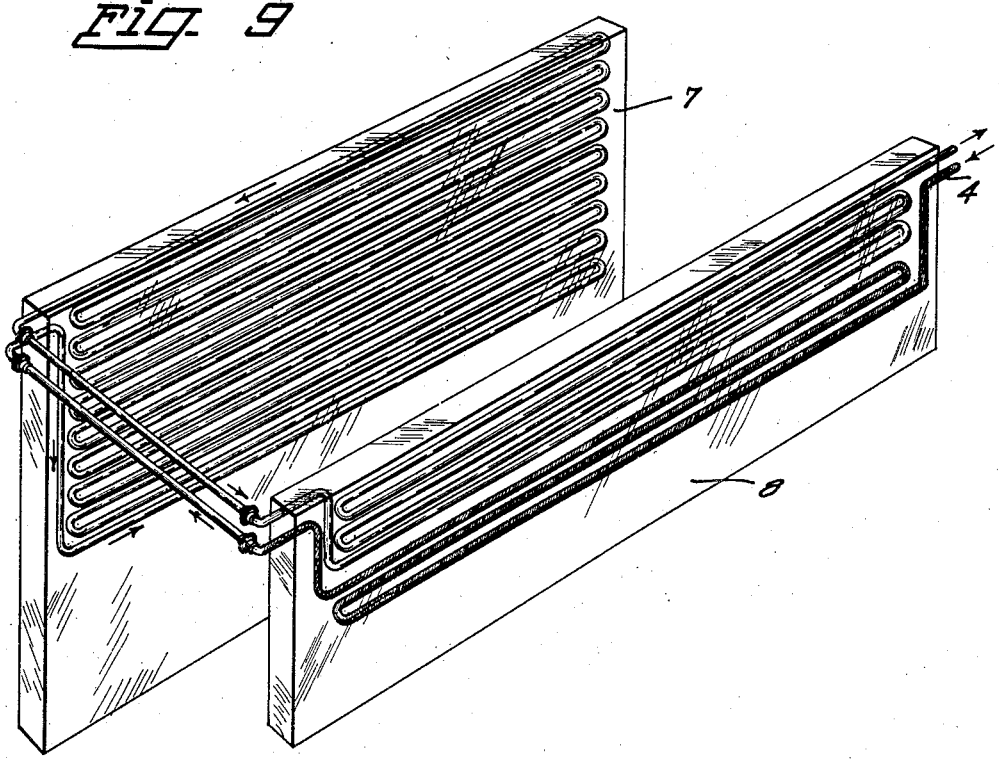
Fig. 9 is a perspective view of a preferred form of tank and expansion coil arrangement made in enlarged detail. The same being in an enlarged view of the diagrammatic layout as shown in plan view in Fig. 8.
Figure 8:
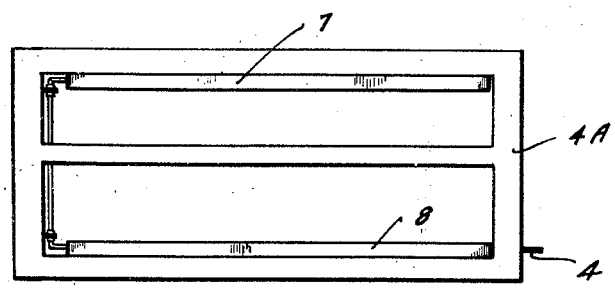
Fig. 8 is a plan view of a preferred form of two temperature expansion coil arrangement.

In the present application what I desire to cover by patent is the arrangement of the tanks for the cooling medium, one of which is located in each compartment to be refrigerated to a relatively different temperature and to the expansion coil arrangement as the same is placed within the tank for the cooling medium to be placed therein. In my tanks for maintaining the cooling medium I am securing satisfactory results by using the tanks with a minimum of width between the perpendicular walls depending quite largely upon the relative temperature to be maintained within each compartment to be refrigerated. I have found that where the tanks and compartments are arranged as shown in Fig. 7, that eleven turns of the coilage in the low temperature compartment and three turns of the expansion coilage in the high temperature compartment, will give a refrigerating temperature difference in the compartments of between five and ten degrees. The temperature variance will somewhat depend upon the character of work for which the compartments are to be used, as well as the manner of relative admissions into the compartments. Heretofore, in plants for this purpose the cooling medium tanks have been made to hold a very substantial quantity of cooling medium. This has been carried to such an extent that the volume of the refrigerating medium coils and the volume of the tanks for maintaining the cooling medium have been a substantial percentage of the volume of the compartments to be refrigerated. In my new and improved construction the volume of the coils and the volume of the tanks for maintaining the cooling medium is but a small percentage of the total volume of the compartments to be refrigerated thereby.

In my present invention no claim is made for the type of machine to be used as the refrigerating machine, as any type may be used that is manufactured, and in commercial use, suitable for the work to be performed.

The refrigerating machine is shown at 1, the same being mounted upon the structural frame 2, which is directly secured to the two temperature cabinets by suitable fastening means.

The refrigerant material is received into the expansion coil at the flanged connection 3, which connects the expansion coil 4, with the expansion valve of the refrigerating unit. The expansion coil is then carried to the low point to be obtained in the high temperature compartment and is then carried for one turn in the tank which carries the cooling medium as brine, or diluted alcohol, or other medium suitable for the work. The cabinet 4ª which is preferably of veneer covered plywood is divided into two insulated compartments 5 and 6. Each compartment has a cooling medium tank disposed therein. The tanks 7 and 8 have spaced side and end walls to form a space for the expansion coil to be placed therebetween. The tank 8 extends around the inner upper periphery of the compartment and has a lesser amount of linear length of the expansion coil therein than the cooling medium tank 7, which has a greater volumetric capacity and extends for practically the full inner periphery of the compartment. An insulated divisional wall 9, divides the cabinet into two insulated compartments. Insulated closure lids 10 and 11 are disposed as closures, to the entrance to each insulated compartment. The expansion coil is then conducted into the low temperature compartment and into the low point in the tank for containing the cooling medium and is then coiled circumferentially within the tank, with each coil placed above the other until a sufficient number of turns have been made and the expansion coil is then carried back a second time into the high temperature compartment and enters the cooling medium tank at a lower point than that at which the highest turn of the coil in the low temperature compartment was raised. The desired number of turns are then taken in the tank and from where the coil is then returned to the refrigerating machine.

The conducting of the expansion coil into the high temperature tank a second time serves a dual purpose. Additional coilage is delivered which carries additional refrigeration into the cooling medium in the high temperature compartment tank and when the same is carried to a lower point than that obtained in the last turns in the low temperature compartment creates an accumulator of the final coilage in the high temperature compartment which has a tendency to prevent any of the liquid within the expansion coil being delivered back into the refrigerating machine.

I have found that the horizontal distance between the substantially vertical walls of the cooling medium tanks need to be but slightly more than the outside diameter of the pipe from which the expansion coils are made. The depth of each tank may be limited to approximately double the depth of the coilage to be placed therein. The number of turns to be taken by the expansion coil in each compartment tank will depend quite largely upon the service for which the same is to be used, and the admissions that are to be made into the compartments. The number of turns will also depend upon the amount of refrigeration that is to be accomplished. That is to say that if cans of ice cream are to be cooled and maintained in a cool state, the capacity of the refrigeration to be accomplished will determine the number and frequency of the cans of ice cream that are to be passed through the two temperature cabinet. I have found that satisfactory results may be obtained for ordinary commercial use, wherein the thickness, or depth between the vertical walls of the cooling medium tank is slightly more than the outside diameter of the pipe from which the expansion coils are made, and that the number of turns of the coil in the cooling medium tanks will give satisfactory commercial results wherein one turn of the expansion coil in the cooling medium tank, is made in the high temperature compartment, then eleven turns are made in the cooling medium tank of the low temperature compartment, after which two additional turns are made in the cooling medium tank of the high temperature compartment. I have found that this arrangement will give a temperature variance in average commercial use of from five to ten degrees Fahrenheit.

The cooling medium, as brine, or diluted alcohol or other suitable material may be placed in the cooling medium tanks at the point of manufacture, as well as the expansion coils, and the same be shipped complete to the point of use.

Each compartment is independent of the other, and each cooling medium tank is independent of the other. The expansion coil as one unit passes from the refrigerating machine through the cooling medium tanks and back to the refrigerating machine as one expansion coil.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:—

1. A refrigerator for a two temperature cabinet, comprising a two compartment, insulated cabinet, an expansion coil running from a refrigerating machine, through each compartment and back to a refrigerating machine, each compartment having a cooling tank with spaced side walls disposed therein and about the expansion coil, one of the cooling medium tanks having a greater amount of surface exposed to the compartment than the other, and one of the cooling medium tanks having a greater amount of expansion coil disposed therein than the other.

2. A refrigerator for a two temperature cabinet, comprising a two compartment, insulated cabinet; a cooling medium tank having spaced side walls, disposed within each compartment; one of said cooling medium tanks having a greater amount of surface exposed to the compartment than the other, an expansion coil passed through each compartment and disposed within the spaced side walls of the cooling medium tanks, and the cooling medium tank having the greater amount of exposed surface, having a greater amount of expansion coilage disposed therein.

3. A refrigerator for a two temperature cabinet, comprising a box-like cabinet, insulating material disposed within said cabinet to form two insulated compartments; vertical walled cooling medium tanks disposed within and parallel the insulated walls of said compartments, and forming the inner walls thereof; one of said tanks having a greater amount of cooling surface exposed to the compartment than the other; an expansion coil leading from a refrigerating machine, through said tanks and back to the machine; there being a greater amount of said expansion coil disposed in the cooling medium tank which has the greater amount of cooling surface than there is in the other tank.

4. A refrigerator for a two temperature cabinet, comprising a two compartment, insulated cabinet; narrow cooling medium tanks disposed in each compartment and having their inner and outer side walls placed parallel and adjacent the side walls of said compartments, said tanks being of different depths the inner side walls of each tank being extended to approximately the bottom of the compartment, an expansion coil passed through said cooling medium tanks, from one to the other; and a greater amount of expansion coilage being disposed in one tank than in the other.

5. In a refrigerator, a cabinet comprising two compartments, means for maintaining a different temperature within each compartment, said means comprising a cooling tank with spaced side walls in each compartment, one of the cooling medium tanks having a greater amount of surface exposed to the compartment than the other, an expansion coil running from a source of refrigerant first through the high temperature compartment tank, then through the low temperature compartment tank, and finally through the high temperature compartment tank at a place lower than the high point of the low temperature compartment, and finally back to the source of refrigerant, there being a greater amount of expansion coil disposed in one compartment than in the other.

6. In a refrigerator, a cabinet having two compartments, one a high temperature compartment and the other a low temperature compartment, an expansion coil running from a source of refrigerant first through and about the high temperature compartment, then through the low temperature compartment at a lower point than in the high temperature compartment, and about said low temperature compartment to a point above the highest point of its flow in the high temperature compartment, said coil then extending through and about the high temperature compartment to a point lower than the highest point of its flow in the low temperature compartment and back again to the source of refrigerant supply, there being a greater amount of expansion coil disposed in the low temperature compartment than in the high temperature compartment whereby greater amount of refrigerant is exposed to the cooling medium in the low temperature compartment than in the high temperature compartment.

JACOB G. PECK.